United States Patent
Schulke et al.

(10) Patent No.: US 7,505,870 B2
(45) Date of Patent: *Mar. 17, 2009

(54) SYSTEM AND METHOD FOR INFORMATION HANDLING SYSTEM THERMAL DIAGNOSTICS

(75) Inventors: Drew Schulke, Austin, TX (US); Barry Kahr, Austin, TX (US); Vinod Makhija, Austin, TX (US); Adolfo Montero, Austin, TX (US); Hasnain Shabbir, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/840,366

(22) Filed: Aug. 17, 2007

(65) Prior Publication Data
US 2007/0288191 A1 Dec. 13, 2007

Related U.S. Application Data

(63) Continuation of application No. 11/130,504, filed on May 17, 2005, now Pat. No. 7,275,019.

(51) Int. Cl.
*G21C 17/00* (2006.01)

(52) U.S. Cl. .................. 702/183; 62/211; 702/132; 702/184; 714/36

(58) Field of Classification Search ........... 702/117, 702/130, 132, 183, 184; 374/57, 127, 137; 62/211; 714/25, 36, 44; 257/780, 786, 837; 700/79, 299
See application file for complete search history.

(56) References Cited

U.S. PATENT DOCUMENTS

| | | | | |
|---|---|---|---|---|
| 5,802,863 A | * | 9/1998 | Cowans | 62/211 |
| 6,453,266 B1 | * | 9/2002 | Chainer et al. | 702/184 |
| 6,542,846 B1 | * | 4/2003 | Miller et al. | 702/132 |
| 6,640,316 B1 | * | 10/2003 | Martin et al. | 714/36 |
| 6,770,906 B2 | | 8/2004 | Corbett et al. | 257/48 |
| 6,830,372 B2 | | 12/2004 | Liu et al. | 374/57 |
| 7,275,019 B2 | * | 9/2007 | Schulke et al. | 702/183 |

* cited by examiner

*Primary Examiner*—John H Le
(74) *Attorney, Agent, or Firm*—Hamilton & Terrile LLP; Robert W. Holland

(57) ABSTRACT

Thermal subsystems of manufactured information handling systems are tested for compliance with desired parameters by running a thermal diagnostics module in firmware during one or more manufacturing activities performed on the information handling system. The thermal diagnostics module monitors and stores one or more thermal parameters detected at the information handling system, such as the maximum temperature zone detected during a manufacturing activity. The stored thermal parameter is read after the manufacturing activity and compared with an expected value to determine the status of the thermal subsystem. For instance, an information handling system maximum operating temperature is detected by firmware running on an embedded controller during imaging of a hard disk drive and fails thermal testing if the detected maximum operating temperature exceeds a predetermined value, such as a value that would not be reached if the thermal subsystem functioning properly.

7 Claims, 3 Drawing Sheets

SYSTEM AND METHOD FOR INFORMATION HANDLING SYSTEM THERMAL DIAGNOSTICS

This application is a continuation of application Ser. No. 11/130,504, filed May 17, 2005 now U.S. Pat. No. 7,275,109, entitled "System and Method for Information Handling System Thermal Diagnostics" and naming Drew Schulke, Barry Kahr, Vinod Makhija, Adolfo Montero, Hasnain Shabbir as inventors, which is hereby incorporated by reference in its entirety.

BACKGROUND OF THE INVENTION

1. Field of the Invention

The present invention relates in general to the field of information handling system manufacture, and more particularly to a system and method for information handling system thermal diagnostics.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are generally built from a large variety of components and subsystems. Manufacture of information handling systems relies on appropriate integration of these various components and subsystems to function at a level deemed acceptable for an end-user environment. For example, thermal subsystems, such as the heat sinks, fans, thermal grease and other components involved in removing excess heat from an information handling system housing, generally must remove enough thermal energy to maintain components within an operating temperature range. If an information handling system thermal solution fails to remove sufficient thermal energy, a variety of detrimental impacts will usually occur. For instance, cooling fans will tend to run at high speeds for extended time periods thus generating increase operating noise, excessive cooling fan wear, increased power consumption and reduced internal battery life in the case of portable systems. As another example, automatic CPU throttling occurs with greater frequency to reduce thermal output of the CPU, and also reducing system performance. In some situations, a thermal shutdown occurs if temperatures become too extreme, resulting in data loss, user inquiries to technical support, and increased warranty and repair costs. Additionally, information handling systems that run at higher temperatures are often uncomfortable to users to handle.

In order to avoid thermal subsystem difficulties, information handling system manufacturers typically test each system for proper thermal operation before shipping the systems to customers. One technique for testing thermal subsystem operation is to run the information handling system with the cooling fans forced off until the system reaches a predefined temperature and then forcing the cooling fans on again to determine if the cooling fans cool the system to a predetermined reduced temperature within a given time period. Properly operating thermal subsystems will reach the reduced temperature in the set time while inadequate thermal subsystems will fail to reach the reduced temperature or take an excessive time period to do so. Although such testing ensures that the thermal subsystem meets minimum requirements, the time to run the test often exceeds ten minutes, more that half of the time typically used to perform overall system testing. Increased testing time for each system increases the number of testing racks needed for testing systems as well as the power consumed by system testing. Further, testing of thermal subsystems by forcing fans on and off does not mimic any actual end-user environment and thus does not represent a realistic view of thermal performance.

SUMMARY OF THE INVENTION

Therefore a need has arisen for a system and method which more quickly and efficiently tests information handling system thermal subsystem performance.

In accordance with the present invention, a system and method are provided which substantially reduce the disadvantages and problems associated with previous methods and systems for testing thermal subsystem performance. A thermal diagnostics module operating in firmware monitors one or more thermal parameters of an information handling system during one or more manufacturing activities, such as the maximum temperature zone reached by the information handling system. The monitored thermal parameter is compared with an expected value to determine proper operation or failure of the thermal subsystem of the information handling system.

More specifically, a thermal diagnostics module is embedded in firmware of a manufactured information handling system, such as in the embedded controller. A thermal diagnostics engine of a manufacture rack enables the thermal diagnostics module to monitor thermal parameters of an information handling system for one or more manufacturing activities, such as during hardware diagnostics, during imaging and/or during final diagnostics. For instance, the thermal diagnostics module stores the highest temperature zone reached during a manufacturing activity and provides the stored value to the thermal diagnostics engine after the manufacturing activity is complete. The detected thermal parameter is compared with an expected value for that information handling system performing the manufacturing activity to determine if the thermal subsystem is operating correctly. If the detected value exceeds the expected maximum value, the information handling system fails the thermal test while, if the detected value is less than the expected maximum value the information handling system passes the thermal test and may be shipped to an end user. Expected thermal parameter values are, for instance, determined with values measured from a properly operating system performing the manufacturing activity.

The present invention provides a number of important technical advantages. One example of an important technical advantage is that background monitoring of thermal performance during other system manufacturing operations provides more realistic testing conditions and reduces manufacturing time by eliminating dedicated thermal performance testing. For instance, tracking maximum temperature zone zones reached during image installation with the BIOS and comparing the measured readings with expected readings provides a closer comparison to end user operating conditions than does operation with the cooling fan forced off. Thermal performance monitoring through BIOS firmware, such as a module running on the embedded controller, operates without interference to the manufacture process. Reading the thermal performance from the firmware after the manufacture process is complete takes minimal time and has a greater likelihood of detecting thermal subsystem failures than does a dedicated thermal subsystem test that also takes an additional ten minutes or more to perform.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Background monitoring of thermal parameters during information handling system manufacture activities verifies proper operation of a thermal subsystem without dedicated thermal testing. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
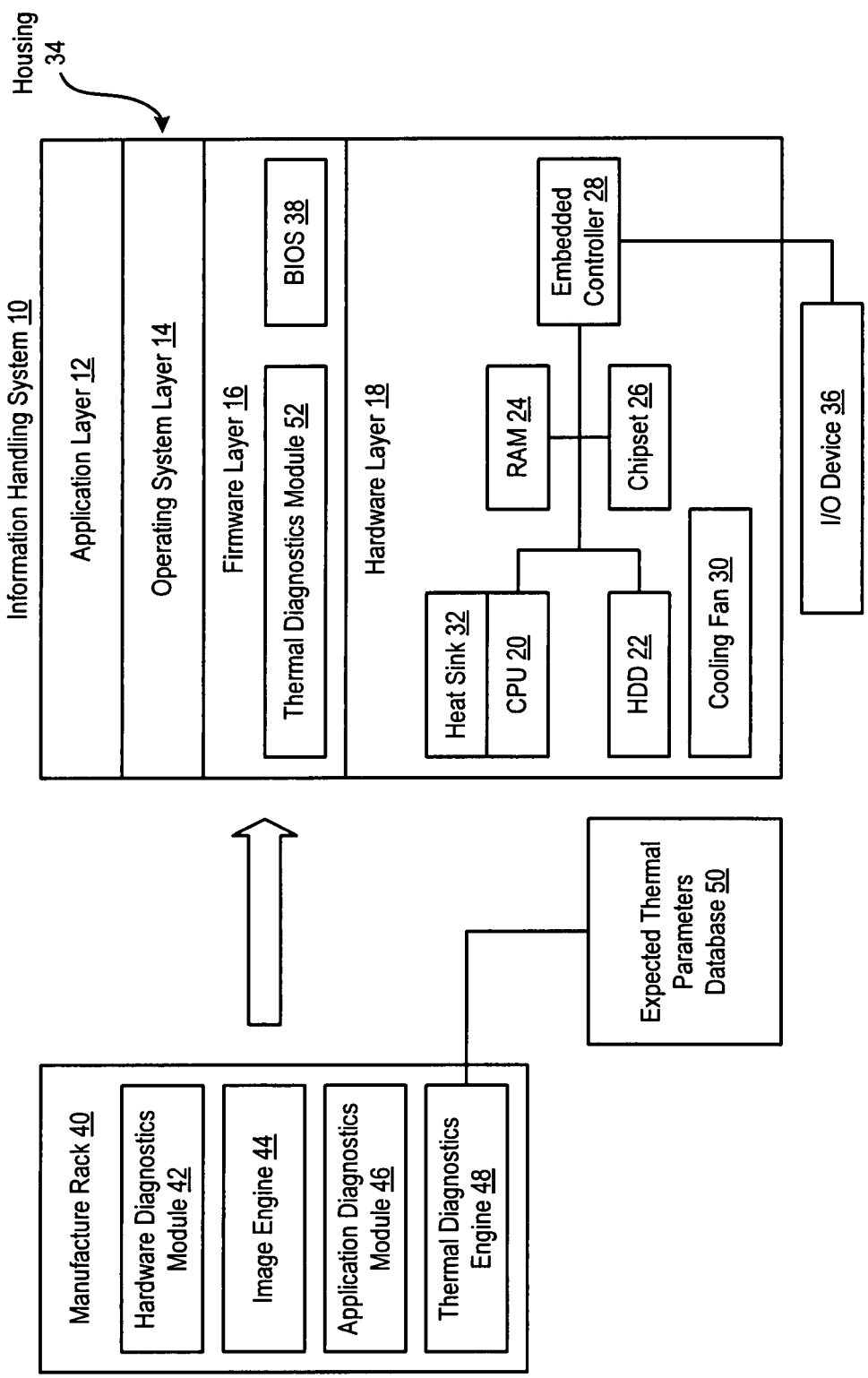
FIG. 1 depicts a block diagram of a system for background thermal diagnostics during information handling system manufacture activities.

Referring now to FIG. 1, a block diagram depicts a system for background thermal diagnostics during information handling system manufacture activities. Information handling system 10 has an application layer 12, operating system layer 14 and a hardware layer 18. Hardware layer 18 includes a number of components to process information, such as a CPU 20, hard disk drive 22, RAM 24 chipset 26 and embedded controller 28. In addition, hardware layer 18 includes a thermal subsystem that removes excess heat generated by operation of the hardware component, such as a cooling fan 30 and heat sink 32. Cooling fan 30 forces a cooling airflow through the housing 34 than contains the components, especially across heat sink 32 which draws heat away from certain components, such as CPU 20. Embedded controller 28 interfaces with cooling fan 30 to alter the operating speed of cooling fan 30 as the temperature changes within housing 34. In addition, embedded controller and chipset 26 coordinate communication between various processing components and I/O devices, such as a keyboard and peripherals. For instance, firmware instructions such as in a BIOS 38 manage communications between processing components at a physical level and manage basic operating parameters, such as fan speed to maintain a desired temperature. Operating system layer 14 runs over the firmware and hardware layers to interface application layer 12 with desired computing resources.

Information handling systems 10 are built at a manufacture rack 40 by first assembling hardware components and then loading software components, such as the operating system and applications. Once the hardware components are assembled, a hardware diagnostics module run hardware diagnostics to detect component failures. After proper hardware component operation is confirmed, an image engine 44 copies a software image onto the assembled information handling system and sets the system up to operate applications for end users. An application diagnostics module 46 then runs final checks on the completed system to ensure compatibility between the assembled hardware components and the loaded applications. Completed systems are shipped to end users and typically serviced by the manufacturer through a warranty period. Identifying system errors on a hardware, firmware or software level before systems are shipped reduces warranty to cost and improves the customer experience.

In order to confirm the proper operation of the thermal subsystem, a thermal diagnostics engine 48 associated with manufacture rack 40 interfaces with each manufactured information handling system 10. Thermal diagnostics engine 48 reads thermal parameters from each information handling system 10 and compares the read thermal parameters with expected thermal parameters found in an expected thermal parameter database 50. The thermal parameters are monitored on each information handling system 10 with a thermal diagnostics module 52 operating in firmware layer 16, such as in conjunction with BIOS 38 on embedded controller 28. Thermal diagnostics engine 48 enables thermal diagnostics module 52 at the start of a predetermined manufacturing activity so that thermal diagnostics module 52 operates in the background as the manufacturing activity takes place to monitor and store one or more thermal parameters. For instance, thermal diagnostics module 52 is initiated at the application of power to information handling system 10 to track maximum temperature zone reach in housing 34 during the manufacture process, including hardware diagnostics, image building and completed system diagnostics. Thermal diagnostics engine 48 reads the maximum temperature zone at the end of the manufacture process and compares the detected maximum temperature zone with an expected maximum temperature zone, such as the temperature reached by a similar information handling system with a properly operating thermal subsystem. If the expected maximum temperature zone is exceeded, the system fails and is sent for analysis while, if the expected maximum temperature zone is not exceeded, the system passes and is shipped to the end user.

Thermal diagnostics module 52 may track temperature during any or all of the hardware diagnostics, image building and application diagnostics, and may track other thermal parameters, such as cooling fan speed.

Figure 2:
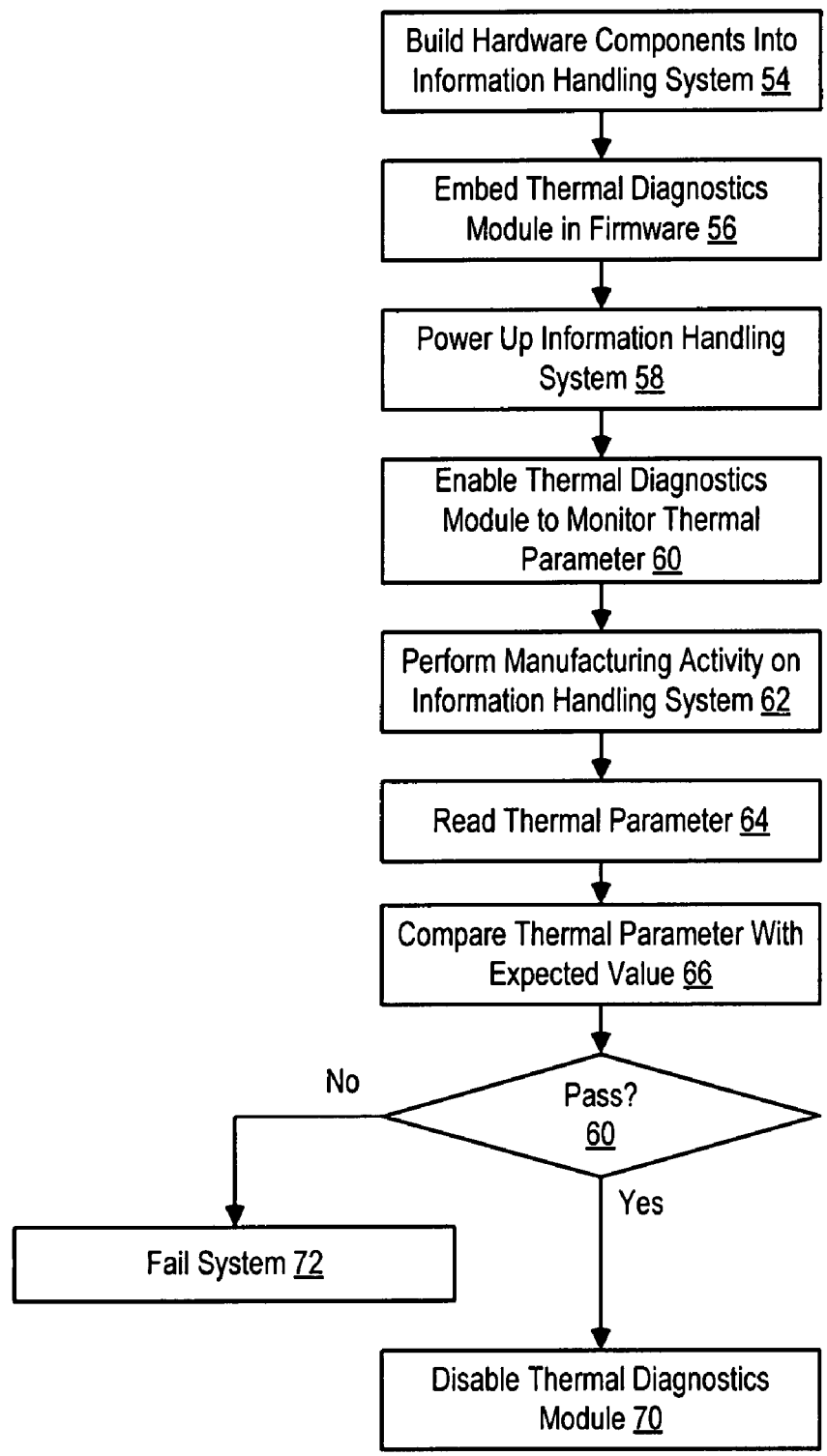
FIG. 2 depicts a flow diagram of a process for background thermal diagnostics during information handling system manufacture activities.

Referring now to FIG. 2, a flow diagram depicts a process for background thermal diagnostics during information handling system manufacture activities. The process begins at step 54 with the assembly of hardware components into an information handling system. At step 56, the thermal diagnostics module is embedded in firmware of the information handling system, such as with instructions saved to the embedded controller. The thermal diagnostics module may be flashed as part of firmware instructions loaded to the assembled information handling system or may be preloaded into the embedded controller before assembly of the components. At step 58, the information handling system is powered up and at step 60 the thermal diagnostics module is enabled to monitor thermal parameters. The thermal diagnostics module is, for instance, enabled during a predetermined portion of the manufacture process so that thermal parameters are detected and stored that correlate with expected values taken from a properly-functioning system during similar activities. At step 62, the manufacturing activity is performed and the thermal diagnostics module monitors thermal parameters during the activity, such as the maximum temperature zone reached. At step 64 the thermal parameter is read from the thermal diagnostics module and, at step 66, compared with an expected value. If, at step 68, the detected thermal parameter does not exceed the expected value, the process completes at step 70 with the disabling of the thermal diagnostics module. If at step 68 the detected thermal parameter exceeds an expected value, the process continues to step 72 for failure of the thermal test by the system.

Figure 3:
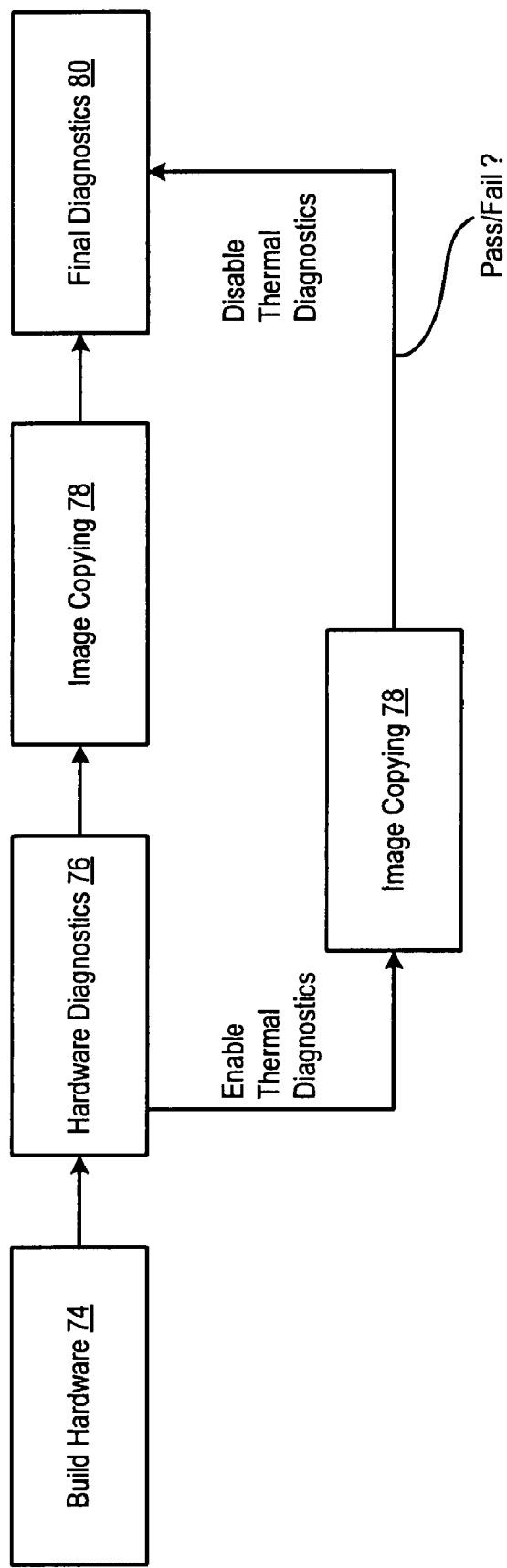
FIG. 3 depicts an information handling system manufacturing time line with background thermal diagnostics.

Referring now to FIG. 3, an information handling system manufacturing time line with background thermal diagnostics is depicted. The information handling system manufacture process begins at step 74 with the building of hardware into an assembled information handling system. The assembled information handling system proceeds through hardware diagnostics at step 76 to ensure proper operation of the hardware and imaging at step 78 to load software applications. At step 80, the completed system is subjected to final diagnostics before shipping to an end user to ensure compatibility and proper operation of the completed software and hardware components. Monitoring of thermal parameters at step 82 is performed during one or more of the manufacturing activities. For instance, hardware diagnostics, imaging and final diagnostics each have thermal parameters that are expected to be reached and may be used to compare with detected thermal diagnostics by selecting the point along the manufacturing time line at which the thermal diagnostics module is enabled and disable. Minimal if any interruption is introduced to the manufacturing activities by the monitoring of thermal parameters with firmware running the background of the main activities, such as loading and testing applications with the CPU.

Although the present invention has been described in detail, it should be understood that various changes, substitutions and alterations can be made hereto without departing from the spirit and scope of the invention as defined by the appended claims.

What is claimed is:

1. A process for testing an information handling system thermal subsystem during manufacture of the information handling system, the process comprising:

assembling hardware components into an information handling system, the components operable to process information at least in part under the control of firmware, the components including a thermal subsystem;

embedding a thermal diagnostics module in firmware of the information handling system;

powering up the information handling system;

performing one or more manufacturing activities on the information handling system;

monitoring one or more thermal parameters with the thermal diagnostics module during the manufacturing activity;

storing at least some of the thermal parameters;

reading the stored thermal parameters after completion of the manufacturing activity; and comparing the monitored thermal parameters with expected thermal parameters to determine either correct operation or failure of the thermal subsystem.

2. The process of claim 1 further comprising:

disabling the thermal diagnostics module after a determination of correct operation of the thermal subsystem.

3. The process of claim 1 wherein embedding a thermal diagnostics module further comprises embedding the module in a BIOS of the information handling system.

4. The process of claim 1 wherein monitoring further comprises monitoring the maximum temperature zone reached within the information handling system during the manufacturing activity.

5. The process of claim 1 wherein the manufacturing activity comprises running diagnostics on hardware loaded in the information handling system.

6. The process of claim 1 wherein the manufacturing activity comprises copying an image to a hard disk drive of the information handling system.

7. The process of claim 1 wherein the manufacturing activity comprises running diagnostics on applications loaded in the information handling system.

\* \* \* \* \*